(12) United States Patent
Hsu et al.

(10) Patent No.: US 7,407,314 B2
(45) Date of Patent: Aug. 5, 2008

(54) KEYPAD LIGHT GUIDE

(75) Inventors: Tung-Ming Hsu, Tu-cheng (TW);
Wen-Feng Cheng, Tu-cheng (TW)

(73) Assignee: Sutech Trading Limited, Tortola (VG)

( * ) Notice: Subject to any disclaimer, the term of this patent is extended or adjusted under 35 U.S.C. 154(b) by 177 days.

(21) Appl. No.: 11/265,366

(22) Filed: Nov. 1, 2005

(65) Prior Publication Data
US 2006/0092619 A1    May 4, 2006

(30) Foreign Application Priority Data
Nov. 4, 2004    (CN) .................... 2004 2 0095020 U

(51) Int. Cl.
*F21V 8/00*  (2006.01)
(52) U.S. Cl. .................. 362/610; 362/27; 362/621; 362/616
(58) Field of Classification Search ................ 362/610, 362/26, 27, 621, 629, 616, 582, 551, 615, 362/609, 623, 558, 620; 400/472
See application file for complete search history.

(56) References Cited
U.S. PATENT DOCUMENTS 3,114,854 A * 12/1963 Koury ........................ 313/483
4,177,501 A * 12/1979 Karlin ......................... 362/26
5,029,981 A *  7/1991 Thompson .................. 359/572
5,053,928 A   10/1991 Pasco
5,746,493 A *  5/1998 Jonsson et al. .............. 362/602
6,295,405 B1 * 9/2001 Jannson et al. .............. 385/146
6,473,554 B1 * 10/2002 Pelka et al. .................. 385/146

* cited by examiner

*Primary Examiner*—Sharon E Payne
(74) *Attorney, Agent, or Firm*—Morris Manning Martin LLP; Tim Tingkang Xia, Esq.

(57) ABSTRACT

A light guide (20) for illuminating keys of a keyboard or keypad of a portable electronic device, includes an array of apertures (22) and a groove (21) at one end of the light guide. The apertures are configured to illuminate the keys via a light source (10). The light source is disposed adjacent to the groove. A peripheral wall around each aperture is configured partially as a reflecting surface, and partially as a transmitting surface. The reflecting angle of the reflecting surface is larger than a critical total internal reflection angle so as to transfer the light farther. The light guide has a desired uniform light by means of a light source. This provides the portable electronic device consuming little power.

12 Claims, 5 Drawing Sheets

KEYPAD LIGHT GUIDE

FIELD OF THE INVENTION

The present invention relates to a light guide for illuminating keys of a keyboard or keypad.

BACKGROUND OF THE INVENTION

Portable electronic devices usually include keyboards or keypads so that information may be inputted to realize information exchange. When portable electronic devices are used in the dark, the keys need to be illuminated. Each individual key may be illuminated by a respective light source located directly behind the key. This arrangement is, however, very expensive since a separate light source is required for each key. Also, without carefully designed diffusers in or behind the keys, unsightly bright spots may be seen through the keys coinciding with the light source.

A more economical approach utilizes fewer light sources with the light being directed toward the keys with the aid of a light guide in the form of a transparent plate. A known light guide includes an array of apertures. A portion of each key depends or extends into the corresponding aperture so that light can be directed into the key from the light guide. Thus, some of the light is directed toward the apertures and so illuminates the keys. A drawback with this arrangement is that it does not give uniform illumination, because the lighting effect deteriorates toward the edges of the keyboard or keypad and other locations further away from the light sources.

An example of a light guide is disclosed in U.S. Pat. Nos. 5,083,240 and/or 5,053,928. The light guide is for a mobile phone, and defines a regular array of apertures which correspond to shaped keys. Four prismatic indentations are defined among the apertures. Each lens is disposed under each indentation in one side of the light guide, and is formed integrally with the light guide. Two square holes are provided in the middle of the light guide. Light is introduced into the light guide from distributed light sources such as light emitting diodes (LEDs) under each corresponding prismatic indentation. Each lens serves to collimate the majority of light from its associated light source into a light beam through the light guide. The indentations and the two square holes are arranged for reflecting light in a localized path substantially surrounding an area of each shaped key. Although the design of the light guide may illuminate the keys, the light guide requires more than one light source, which is an added cost and consumes more power.

Therefore, a new light guide is desired in order to overcome the above-described shortcomings.

SUMMARY

A new light guide for portable electronic devices such as mobile phones is provided.

The light guide is suitable for devices such as mobile phones. One embodiment of the light guide for illuminating keys of a keyboard or keypad of a portable electronic device, includes an array of apertures and a groove at one end of the light guide. The apertures are configured to illuminate the keys via one light source. The light source is disposed adjacent to the groove. A peripheral wall around each aperture is configured partially as a reflecting surface, and partially as a transmitting surface. The reflecting angle of each reflecting surface is controlled to be larger than a critical total internal reflection angle so as to transfer the light farther.

Other advantages and novel features will become more apparent from the following detailed description when taken in conjunction with the accompanying drawings, in which:

DETAILED DESCRIPTION OF THE EMBODIMENTS

Figure 1:
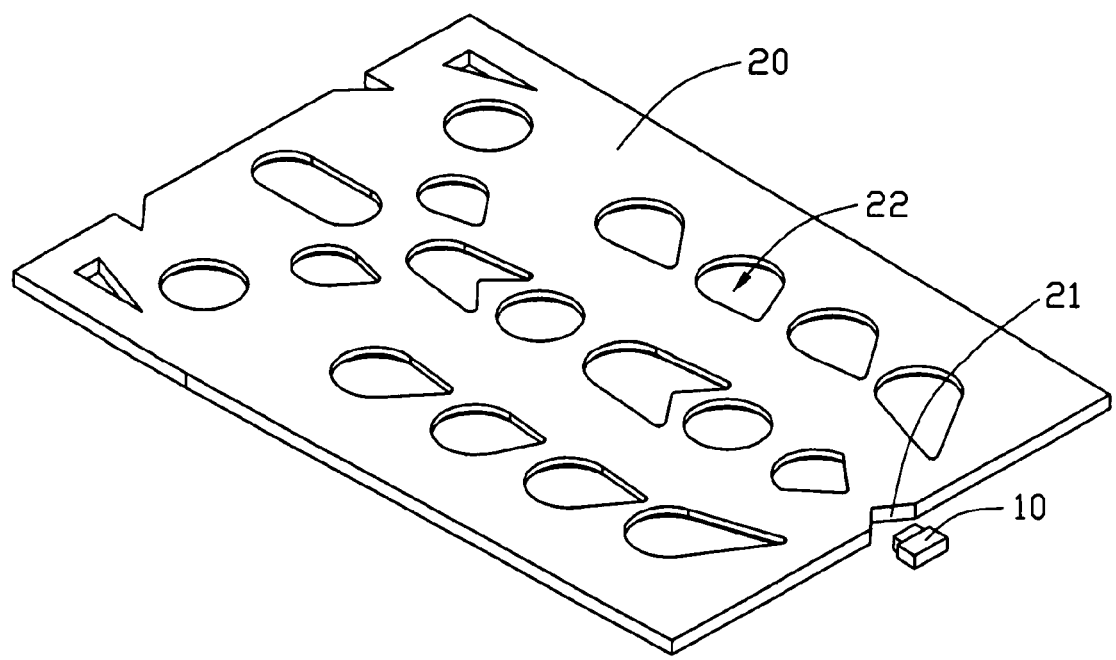
FIG. 1 is an isometric view of a light guide according to one embodiment, together with a light source, the light guide comprising a plurality of apertures.

Referring now to the drawings in detail, FIG. 1 shows a transparent plate-like light guide 20 having a generally rectangular outline in accordance with one embodiment of the present invention. The light guide 20 can be applied in an electronic device such as a mobile phone.

The light guide 20 has a generally grid-like configuration, and includes an array of apertures 22 substantially arranged in five rows and three columns. The apertures 22 correspond to indicators like keys (not shown) of the device like the mobile phone. When the keys are located within the apertures 22, light can readily be directed into the keys from the light guide 20. The light guide 20 has a groove 21 on one end thereof, the groove 21 having a "V" configuration. A light source 10, such as a light emitting diode (LED), is disposed near the groove 21.

Figure 2:
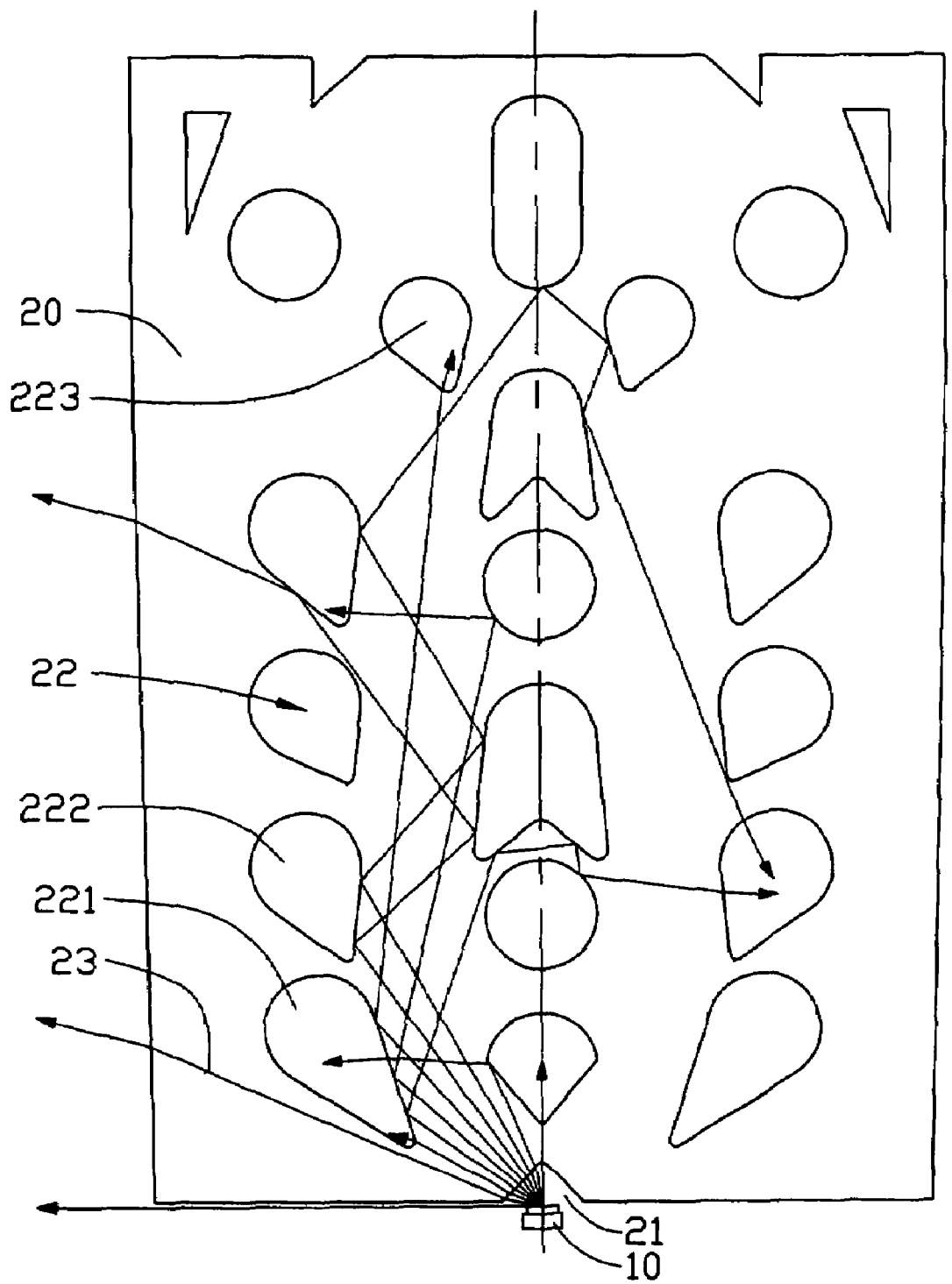
FIG. 2 is a top plan view of FIG. 1, showing paths of light rays in a range of 0-90 degrees when the light guide is illuminated.
Figure 3:
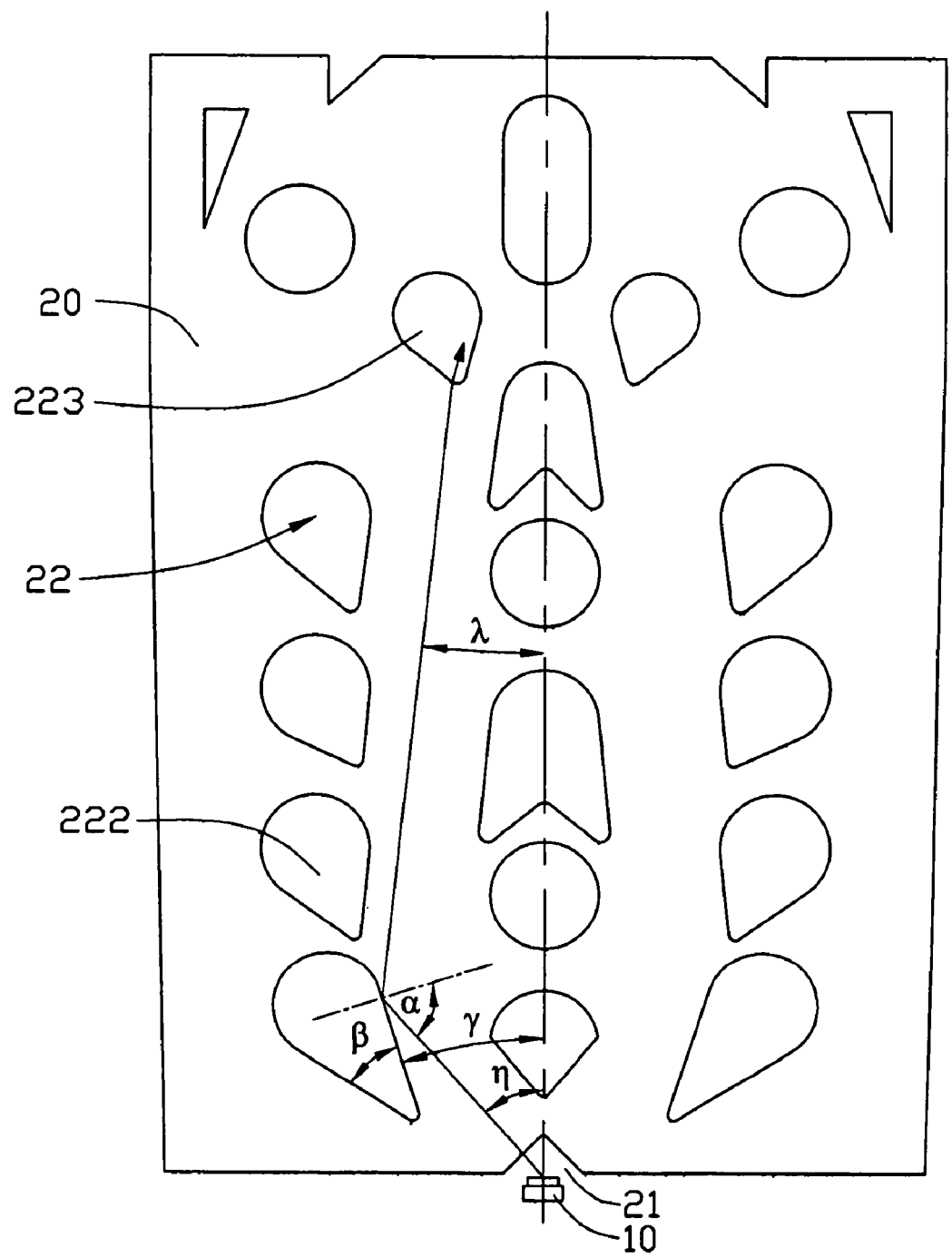
FIG. 3 is similar to FIG. 2, but showing a light path of a single light ray.

Referring to FIG. 2, many light rays 23 are shown (not individually labeled). A center line (shown as a dash-line) is defined in the light guide 20. The light rays 23 are only shown in a range of 0-90 degrees, relative to the center line. During design of the light guide 20, many light rays from the light source 10 are simulated by means of a computer. Each aperture 22 is surrounded by a peripheral wall. The peripheral wall includes transmitting surfaces and reflecting surfaces. The transmitting surfaces transmit light to the aperture 22, thereby illuminating the keys. The reflecting surfaces reflect light to the next aperture 22. The positions of the reflecting surfaces of each aperture 22 are configured so as to pass the light to a far position. Referring to FIG. 3, one light ray is shown to explain how to configure a position of a reflecting surface of a first aperture 221. An angle of the reflecting surface relative to the center line is defined as "$\gamma$". An angle between two reflecting surfaces is defined as "$\beta$". An angle of an incidence light ray with respect to the center line is defined as "$\eta$". When the light ray strikes the reflecting surface, the light ray is reflected. The reflection angle of the light ray is defined as "$\alpha$". A relationship among "$\alpha$", "$\gamma$", and "$\eta$" is $$\gamma = \eta + \alpha - 90$$

Because "η" is known, "γ" will control the angle of "α". During design, the "γ" angle may be adjusted to control the "α" change. A target angle is defined as "λ". A relationship among "α", "γ", and "λ" is $$\lambda = 90 - \gamma - \alpha$$

Accordingly, when "γ" is determined, the target angle "λ" is determined by the above formula. The "α" angle is designed to be bigger than a critical total internal reflection angle so that the light can be transmitted farther. A material of the light guide 20, which is suitably formed by injection molding, may be any suitable optical quality transparent material such as polymethyl methacrylate (PMMA), polycarbonate (PC), and so on. The critical total internal reflection of PC is 39.27, so the "α" angle needs to be more than 39.27. If the material of the light guide 20 is PMMA, the critical total internal reflection of PMMA is 42.16, so the "α" angle needs to be more than 42.16. For the reflecting surface of the first aperture 221, the light rays are tested for optimum reflection. Accordingly, the "γ" angle is adjusted to achieve optimum reflection. The reflecting surface may be extended so as to accept most of the light rays. The "β" angle determines a configuration of the first aperture 221, which depended on the molding technologies. Usually, the "β" angle is more than 40 degrees. After the first aperture 221 is designed, a "γ" angle is determined. Accordingly, the target angle "λ" of the first aperture 221 is determined. The target angle "λ" can be used to determine the direction of the light ray. Other apertures 22 are designed through the above method. Finally, the reflecting surface of each aperture 22 is adjusted for many light rays to achieve uniformity.

In practice, the method of designing a light guide includes the following steps: Firstly, a position of each aperture and the number of light sources is determined by the customer. Secondly, an initial computer simulation for the light guide is performed to determine which positions are strong or weak for the light. Thirdly, a reflecting surface of each aperture is designed aiming at the weak position by means of a raytrace design method. During the third step, the angle of a reflecting surface of each aperture is adjusted so as to be larger than the critical total internal reflection.

Figure 4:
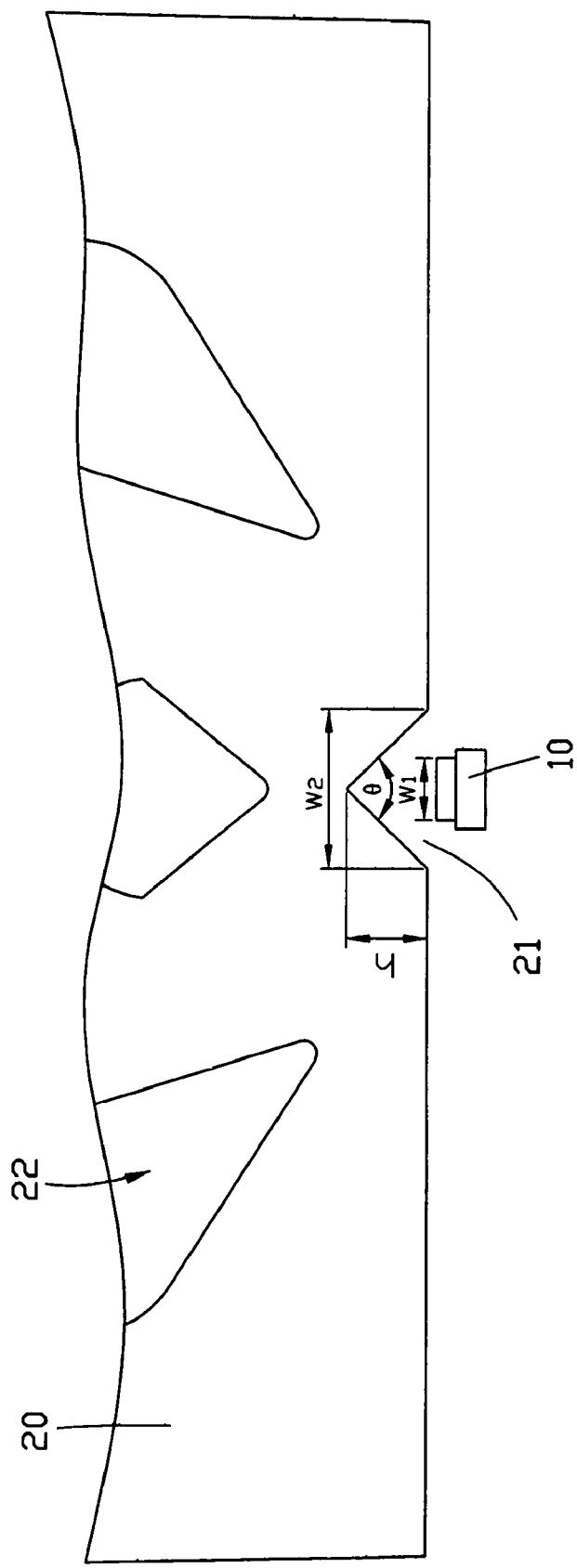
FIG. 4 is an enlarged, top plan view of an end of the light guide and the light source of FIG. 1, showing a groove of the light guide.

Referring to FIG. 4, the groove 21 may effectively disperse the light of the light source 10 to the light guide 20 in order to avoid the "hot spot" effect. During design, a width of the groove 21 may be calculated. A width of an effective illuminating area of the light source 10 is defined as "$W_1$". An angle of the groove 21 is defined as "θ". A width of the groove 10 is defined as "$W_2$". A height of the groove 10 is defined as "h". $W_i$ is in a range from 1 mm to 2 mm. Under these conditions, "$W_2$" is determined by the formula:

$$W_2 = W_1 + W_1$$

The height of the groove 10 is determined by the formula:

$$h = (w_2/2)/\tan(\theta/2)$$

A preferred angle of the groove 21 is in a range of 70-90 degrees. $W_1$ is known. Accordingly, a value of h is determined.

Figure 5:
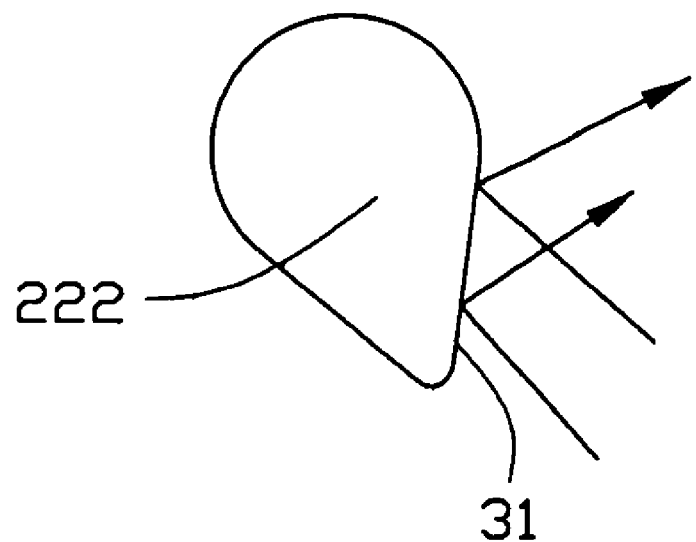
FIG. 5 is a view of one aperture showing in FIG. 2, showing reflection of light rays at a plane reflecting surface of the aperture.
Figure 6:
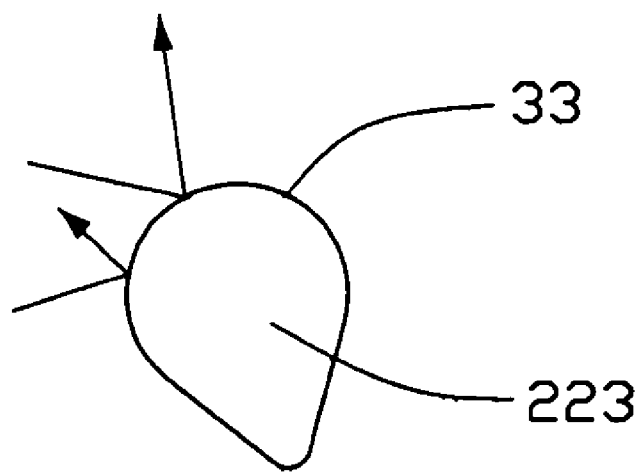
FIG. 6 is similar to FIG. 5, but showing reflection of light rays at an arcuate reflecting surface of the aperture.

Also referring to FIG. 5, the reflecting surface may be planar, for example, a planar reflecting surface 31 of the aperture 222. The planar reflecting surface 31 may redirect the light ray along to a single direction. Also referring to FIG. 6, the reflecting surface may be an arcuate surface, for example, an arcuate reflecting surface 33 of the aperture 223. The arcuate reflecting surface 33 may redirect the light ray along varying directions, depending on point of incidence of the light ray. A thickness of the light guide 20 is in a range of 0.8-1.2 millimeter.

In alternative embodiments, the apertures 22 may be circular. Many recesses are defined among the apertures 22. A peripheral wall of each recess functions as a reflecting surface and as a transmitting surface. The reflecting surfaces are configured for optimum reflection so that the light can be uniformly transmitted farther.

As described above, the preferred embodiments provide a light guide yielding a desired uniform light by means of a single light source, thus requiring little power.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

We claim:

1. An electronic device comprising:
  an array of indicators capable of exposing readable information to an outside of said electronic device along a side of said electronic device;
  a light source used for providing light to illuminate said array of indicators; and
  a light guide positioned at one side of said array of indicators along said side of said electronic device, said light source disposed at one end of said light guide, and said light guide capable of receiving said light from said light source and transmitting said light toward said array of indicators, said light guide comprising an array of apertures corresponding to said array of indicators in order for respectively accommodating said array of indicators therein, more than one aperture of said array of apertures configured to form at least one reflecting surface along a peripheral wall thereof so as to reflect said light inside said light guide from said light source toward other apertures of said array of apertures for illumination of said array of indicators therein, wherein a reflecting angle of said at least one reflecting surface is determined by the following formula:

$$\gamma = \eta + \alpha - 90$$

where α is said reflecting angle of said at least one reflecting surface, η is an incidence angle of light rays, and γ is an angle of said at least one reflecting surface relative to an imaginary center line of said light guide.

2. The electronic device as claimed in claim 1, wherein said reflecting surface is a selective one of a planar surface and an arcuate surface along said peripheral wall of said more than one aperture of said array of apertures.

3. The electronic device as claimed in claim 1, wherein a reflection angle of each of said at least one reflecting surface is controlled to be larger than a critical total internal reflection angle of said light guide.

4. The electronic device as claimed in claim 1, wherein a groove is formed on said light guide to face said light source and receive said light from said light source, and an angle of said groove is in the range of 70-90 degrees.

5. The electronic device as claimed in claim 4, wherein a height of said groove is determined by the following formula:

$$h = (w_2/2)/\tan(\theta/2)$$

where h is the height of said groove, θ is an angle of said groove, and $w_2$ is a width of said groove.

6. The electronic device as claimed in claim 5, wherein said width of said groove is determined by the following formula:

$$w_2 = w_1 + w_i$$

where $w_2$ is said width of said groove, $w_i$ is a width of an effective illuminating area measured from said light source, and $w_i$ is in a range from 1 millimeter to 2 millimeters.

7. The electronic device as claimed in claim 1, wherein said light guide is made of a selective one of Polymethyl Methacrylate and Polycarbonate.

8. The electronic device as claimed in claim 1, wherein a thickness of said light guide is in a range of 0.8-1.2 millimeters.

9. A method of manufacturing a light guide for contributing to illuminating an array of indicators, the method comprising the steps of:
forming a base of a light guide from light-transmissible material;
defining a groove in one end of the light guide, for receiving light from a light source;
forming an array of apertures in said base corresponding to an arrangement of an array of indicators so that each aperture of said array of apertures is capable of accommodating a respective one of said array of indicators; and
reshaping at least one aperture of said array of apertures in order to create a reflecting surface along a periphery wall of said at least one aperture of said array of apertures, said reshaping step comprising the step of adjusting a reflecting angle of said reflecting surface of said at least one aperture so as to be larger than a critical total internal reflection angle of said light guide, and said reflecting angle of said reflecting surface is determined by the following formula:

$$\delta = \eta + \alpha - 90$$

where $\alpha$ is said reflecting angle of said reflecting surface, $\eta$ is an incidence angle of light rays, and $\gamma$ is an angle of said reflecting surface relative to an imaginary center line of said light guide.

10. The method as claimed in claim 9, further comprising the step of confirming a position for said each aperture and the light source to be used with said light guide before said aperture-forming step.

11. The method as claimed in claim 10, further comprising the step of simulating an initial design for said light guide so as to perfect said position for said each aperture based on simulated results of light illumination.

12. The method as claimed in claim 9, wherein a target angle of said reflecting surface is determined by the following formula:

$$\lambda = 90 - \gamma - \alpha$$

where $\lambda$ is a target angle of said reflecting surface.

* * * * *